US009570752B2

(12) United States Patent
Huang et al.

(10) Patent No.: US 9,570,752 B2
(45) Date of Patent: Feb. 14, 2017

(54) NEGATIVE ELECTRODE MATERIAL FOR LITHIUM-BASED BATTERIES

(71) Applicant: GM Global Technology Operations LLC, Detroit, MI (US)

(72) Inventors: Xiaosong Huang, Novi, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 14/280,257

(22) Filed: May 16, 2014

(65) Prior Publication Data

US 2015/0333318 A1  Nov. 19, 2015

(51) Int. Cl.
| | |
|---|---|
| H01M 2/16 | (2006.01) |
| H01M 4/62 | (2006.01) |
| H01M 4/36 | (2006.01) |
| H01M 10/0525 | (2010.01) |
| H01M 4/485 | (2010.01) |
| H01M 4/587 | (2010.01) |
| H01M 4/58 | (2010.01) |
| H01M 2/18 | (2006.01) |

(Continued)

(52) U.S. Cl.
CPC ............ *H01M 4/622* (2013.01); *H01M 2/18* (2013.01); *H01M 4/0404* (2013.01); *H01M 4/0471* (2013.01); *H01M 4/134* (2013.01); *H01M 4/1395* (2013.01); *H01M 4/364* (2013.01); *H01M 4/366* (2013.01); *H01M 4/386* (2013.01); *H01M 4/485* (2013.01); *H01M 4/587* (2013.01); *H01M 4/5825* (2013.01); *H01M 4/625* (2013.01); *H01M 10/0525* (2013.01); *H01M 10/0568* (2013.01); *H01M 10/0569* (2013.01); *H01M 10/052* (2013.01); *H01M 2004/027* (2013.01); *H01M 2300/0028* (2013.01); *Y02E 60/122* (2013.01)

(58) Field of Classification Search
CPC .... H01M 4/622; H01M 4/386; H01M 4/5825; H01M 4/133; H01M 4/625; H01M 4/134; H01M 4/1395; H01M 4/16; H01M 10/0525
See application file for complete search history.

(56) References Cited

U.S. PATENT DOCUMENTS

| | | | |
|---|---|---|---|
| 7,972,725 B2 | 7/2011 | Krause et al. | |
| 2004/0009396 A1* | 1/2004 | Kim | H01M 4/136 429/212 |

(Continued)

*Primary Examiner* — Patrick Ryan
*Assistant Examiner* — Ben Lewis
(74) *Attorney, Agent, or Firm* — Dierker & Kavanaugh, P.C.

(57) ABSTRACT

A negative electrode material includes an active material, which is present in an amount ranging from about 60 wt % to about 95 wt % of a total wt % of the negative electrode material. The negative electrode material further includes a polyimide binder, which is present in an amount ranging from about 1 wt % to about 20 wt % of the total wt % of the negative electrode material. The polyimide binder contains a repeating unit, where a backbone structure of each repeating unit has no ether group present and no more than one carbonyl group present. The negative electrode material also includes a conductive filler, which is present in an amount ranging from about 3 wt % to about 20 wt % of the total wt % of the negative electrode material.

19 Claims, 6 Drawing Sheets

(51) Int. Cl.
*H01M 10/0569* (2010.01)
*H01M 10/0568* (2010.01)
*H01M 4/04* (2006.01)
*H01M 4/134* (2010.01)
*H01M 4/1395* (2010.01)
*H01M 4/38* (2006.01)
H01M 4/02 (2006.01)
H01M 10/052 (2010.01)

(56) References Cited

U.S. PATENT DOCUMENTS

| | | | |
|---|---|---|---|
| 2011/0189540 A1* | 8/2011 | Mori | H01M 4/13 |
| | | | 429/213 |
| 2011/0287317 A1* | 11/2011 | Nakanishi | H01M 4/134 |
| | | | 429/218.1 |
| 2012/0032109 A1* | 2/2012 | Konig | H01M 4/131 |
| | | | 252/182.1 |
| 2012/0202117 A1 | 8/2012 | Hirose et al. | |
| 2013/0184385 A1 | 7/2013 | Ogihara | |
| 2013/0260020 A1 | 10/2013 | Tomikawa et al. | |
| 2014/0011083 A1* | 1/2014 | Asako | H01M 4/624 |
| | | | 429/211 |

* cited by examiner

NEGATIVE ELECTRODE MATERIAL FOR LITHIUM-BASED BATTERIES

BACKGROUND

Secondary, or rechargeable, lithium ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of a negative electrode material includes an active material, which is present in an amount ranging from about 60 wt % to about 95 wt % of a total wt % of the negative electrode material. The negative electrode material further includes a polyimide binder, which is present in an amount ranging from about 1 wt % to about 20 wt % of the total wt % of the negative electrode material. The polyimide binder contains a repeating unit, where a backbone structure of each repeating unit has no ether group present and no more than one carbonyl group present. The negative electrode material also includes a conductive filler, which is present in an amount ranging from about 3 wt % to about 20 wt % of the total wt % of the negative electrode material.

Examples of the negative electrode material disclosed herein may be included in a negative electrode for a lithium ion battery or a lithium-sulfur battery.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
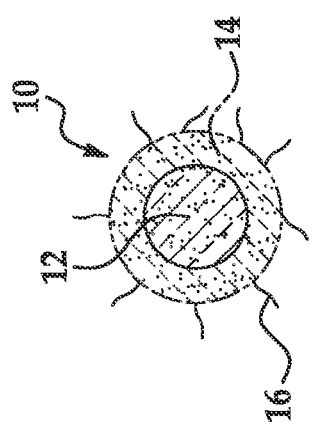
FIG. 1 is a cross-sectional view of an example of the active material used in the negative electrode material disclosed herein.

The high theoretical capacity (e.g., 4200 mAh/g) of silicon renders it desirable for use as a negative electrode active material in lithium-based batteries. However, it has been found that negative electrode active materials (e.g., silicon particles) with high specific capacities also have large volume expansion and contraction during charging/discharging of the lithium-based battery. The large volume change (e.g., about 300%) experienced by the negative electrode active material during charging/discharging causes the negative electrode active material to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change.

In the examples disclosed herein, it has been found that one way to improve the cycling performance of the silicon negative electrode active material is by including a polyimide binder, which contains a repeating unit having no ether group present in the backbone structure and no more than one carbonyl group present in the backbone structure. It is to be understood that while no or one carbonyl is present in the backbone, carbonyl group(s) (C=O) may be present in amide groups and/or carboxyl groups that are attached to the backbone chain. It is to be further understood that the polyimide does not include any ether groups.

The presence of ether and carbonyl groups in the backbone structure of the repeating unit alters the backbone structure of polyimide binder, which affects the performance of the negative electrode. It has been found by the present inventors that when there are ether group(s) present and/or more than one carbonyl group present in the backbone structure of the repeating unit of the polyimide binder, the polyimide binder is more susceptible to reacting with a component of the electrolyte solution (e.g., a carbonate in the electrolyte solution of a lithium ion battery). As a result of this reaction, the polyimide binder will swell in the electrolyte. Swelling can lead to reduced adhesion between the polyimide binder and the active material, reduced chemical performance of the polyimide binder, and reduced overall capacity of the battery. When no ether group and no more than one carbonyl group are present in the backbone of the repeating unit of the polyimide (as set forth in the examples disclosed herein), the absorption experienced by the polyimide binder in the electrolyte decreases significantly (i.e., binder swelling is reduced). When the absorption decreases, the overall capacity of the battery increases, which improves the overall battery performance.

It has been found that another way to improve the cycling performance of the silicon negative electrode active material is by including graphite particles in addition to the silicon particles. Graphite has less capacity than silicon, but also experiences less of a change in volume expansion and contraction than silicon during battery cycles. It is believed that the addition of graphite to silicon in the negative electrode does not deleteriously affect the specific capacity of the electrode and also reduces the stress on the negative electrode by reducing the dimensional change. Thus, when graphite is included as a portion of the active material particles in the negative electrode, it reduces fracturing, decrepitating, and other mechanical degradation. The combination of graphite and silicon is believed to improve the cycling performance of the negative electrode. Since poor cycling performance often includes a large capacity fade, the improved performance cycling decreases the capacity fade as well.

Figure 2:
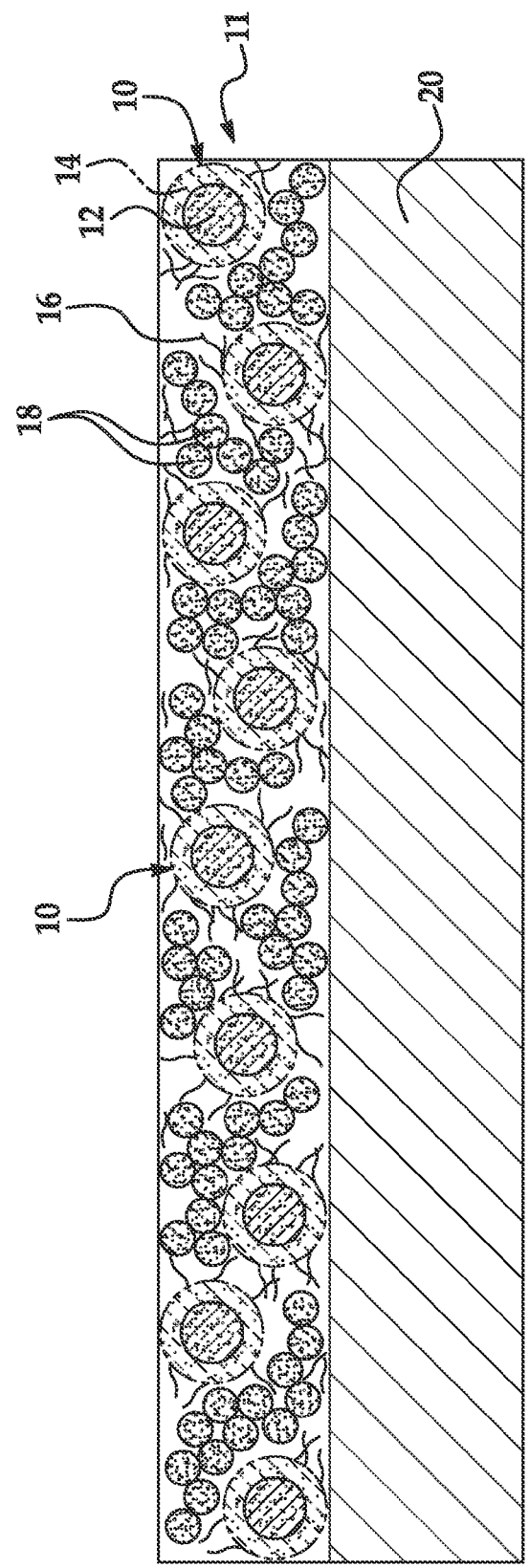
FIG. 2 is a cross-sectional view of an example of a negative electrode on a current collector.

Referring now to FIG. 1, an example of an active material 10 used in the negative electrode (reference numeral 11 in FIG. 2) is depicted. The active material 10 includes an active material particle 12. In an example, the active material 10 may further include a carbon coating 14 encapsulating the active material particle 12. The active material 10, with or without the carbon coating 14, ranges from about 30 nm to about 5 μm in diameter. Active materials 10 having a diameter ranging from about 30 nm to under 1000 nm may be referred to as nanoparticles, and active materials 10 having a diameter ranging from 1000 nm (1 μm) to about 5 μm may be referred to as microparticles.

The active material particles 12 may be formed of silicon or a silicon alloy. Some examples of the silicon alloy include silicon-containing binary or ternary alloys, such as Si—Sn, SiSnFe, SiSnAl, SiFeCo, etc. The active material particles 12 may be silicon or silicon alloy nanoparticles, silicon or silicon alloy microparticles, or a combination thereof. In an example, the silicon or silicon alloy is a powder (e.g., silicon or silicon alloy micro- or nano-powders). It is to be understood, however, that the silicon or silicon alloy may be in the form of a silicon or silicon alloy nanotube (hollow, tubular shaped silicon), a silicon or silicon alloy nanofiber (i.e., nanowire), etc.

The carbon coating 14 may be any desirable form of carbon. The thickness of the carbon coating 14 ranges from about 1 nm to about 20 nm. In an example, the carbon coating 14 is applied to the active material particles 12 by chemical vapor deposition (CVD) or physical vapor deposition (PVD). In another example, the active material particles 12 are dispersed in a polymer solution, such as polyacrylonitrile, to form a polymer coating on the surface of the active material particles 12. The polymer coated active material particles 12 are subjected to carbonization using an inert gas, where carbonization takes place at a temperature above 500° C.

Another example of a suitable active material particle 12 is graphite. In some of the examples disclosed herein, the graphite may be used in combination with other active materials 10. Some commercial forms of graphite that may be used as the active materials 12 are available from, for example, Timcal Graphite & Carbon (Bodio, Switzerland), Lonza Group (Basel, Switzerland), or Superior Graphite (Chicago, Ill.).

FIG. 1 also illustrates a polyimide binder 16 bound to the active material 10. It is to be understood that the polyimide binder 16 may be bound to the active material particle 12 or to the carbon coating 14 (for example, when carbon coated silicon is the active material 10). The polyimide binder 16 may bind to the active material 10 during the formation of a negative electrode 11 (FIG. 2) including both materials 10, 16. Examples of the method for making the negative electrode 11 will now be discussed in reference to FIG. 2.

In the examples of the method disclosed herein, the active material 10 is mixed with other negative electrode material components to form a dispersion or slurry. Examples of the other negative electrode material components include a solution of a polyimide pre-polymer (which subsequently undergoes imidization to form the polyimide binder 16) and a conductive filler 18.

As mentioned above, the polyimide binder 16 may bind to the active material 10 during electrode formation, and more particularly during imidization of the polyimide pre-polymer. An example of the polyimide pre-polymer is poly(amic acid). The polyimide pre-polymer may be prepared as a solution, to which the active materials 10 and the conductive additive 18 are added.

In an example, the polyimide pre-polymer solution is formed from mixing dianhydride monomer(s) and diamine monomer(s) in a polar aprotic solvent to form a solution. Some examples of dianhydride monomers include:

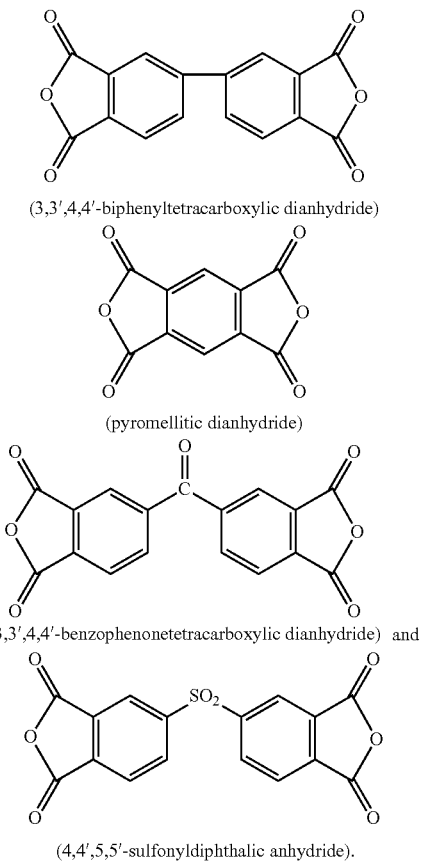

(3,3′,4,4′-biphenyltetracarboxylic dianhydride)

(pyromellitic dianhydride)

(3,3′,4,4′-benzophenonetetracarboxylic dianhydride) and (4,4′,5,5′-sulfonyldiphthalic anhydride).

In examples disclosed herein, the diamine contains no ether group. Examples of the diamine monomer are p-phenylenediamine, toluene diamine, and diaminodiphenylmethane.

Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof.

The diamine and the dianhydride are added to the polar aprotic solvent to form the polyimide pre-polymer solution. Within the polyimide pre-polymer solution, the dianhydride may be in a slight stoichiometric excess of the diamine. In an example, the stoichiometric excess of the dianhydride (relative to the diamine) ranges from about 0.01% to about 5%. The polyimide pre-polymer solution may be kept at a temperature ranging from about 0° C. to about ambient/room temperature (e.g., from about 18° C. to about 22° C.). Within the polyimide pre-polymer solution, the intermediate or pre-polymer, poly(amic acid), forms due to the nucleophilic attack of the amino group(s) of the diamine on the carbonyl carbon of some of the anhydride group(s) of the dianhydride. The amount of solvent used in the solution may vary, depending upon the amounts of diamine and dianhydride that are used. In an example, the final solution includes from about 1 wt % to about 50 wt % of the poly(amic acid), and a remaining balance of the solvent. In an example, the concentration of the polyimide pre-polymer solution ranges from about 1 g/100 g (of solution) to about 15 g/100 g (of solution).

Once the polyimide pre-polymer solution is prepared, the active material(s) 10 is/are added to the solution to form the dispersion/slurry.

The conductive filler 18 may also be added to the dispersion/slurry. The conductive filler 18 may be a high surface area carbon, such as acetylene black (i.e., carbon black). Other examples of suitable conductive fillers include graphene, carbon nanotubes, and/or carbon nanofibers. In yet another example, a combination of conductive fillers is used, such as carbon black and carbon nanofibers. The conductive filler 18 is included to ensure electron conduction between a negative-side current collector (i.e., support 20) and the active material 10.

In an example, the dispersion/slurry includes the polar aprotic solvent, the polyimide pre-polymer, the active material(s) 10, and the conductive filler 18. The amount of polar aprotic solvent that is included in the dispersion/slurry will depend upon the concentration of the polyimide pre-polymer solution and the amount of polyimide pre-polymer solution used in the slurry. In one example of the dispersion/slurry, the amount of the active materials 10 ranges from about 65 wt % to about 95 wt % (based on total solid wt % of the dispersion/slurry), the amount of the conductive filler 18 ranges from about 3 wt % to about 20 wt % (based on total solid wt % of the dispersion/slurry), and the amount of the polyimide pre-polymer, which forms the polyimide binder 16, ranges from about 1 wt % to about 20 wt % (based on total solid wt % of the dispersion/slurry).

If graphite is used in combination with the other active materials 10 (i.e., silicon 12 or carbon coated silicon 12, 14 for example), the graphite is present in an amount ranging from about 1 wt % to about 20 wt % (based on total solids wt % of the dispersion/slurry). If the graphite is included, the amount of the other active material 10 may be lowered by the amount of graphite that is included. For example, a dispersion without graphite may include 75 wt % of the silicon active material 10, while a dispersion with graphite may include 65 wt % of the silicon active material 10 and 10 wt % of the graphite active material.

After all the components are added to form the dispersion/slurry, the dispersion may be mixed by milling. Milling aids in transforming the dispersion/slurry into a coatable mixture. Low-shear milling or high-shear milling may be used to mix the dispersion/slurry. The dispersion/slurry milling time ranges from about 10 minutes to about 20 hours depending on the milling shear rate. In an example, a planetary mixer is used for about 3 hours to mill the dispersion/slurry.

The dispersion is then deposited onto a support 20. In an example, the support 20 is a negative-side current collector. It is to be understood that the support 20 may be formed from copper or any other appropriate electrically conductive material known to skilled artisans. The support 20 that is selected should be capable of collecting and moving free electrons to and from an external circuit connected thereto.

The dispersion may be deposited using any suitable technique. As examples, the dispersion may be cast on the surface of the support 20, or may be spread on the surface of the support 20, or may be coated on the surface of the support 20 using a slot die coater.

The deposited dispersion may be exposed to a drying process in order to remove any remaining solvent. Drying may be accomplished using any suitable technique. Drying may be performed at an elevated temperature ranging from about 60° C. to about 150° C. In some examples, vacuum may also be used to accelerate the drying process. As one example of the drying process, the deposited dispersion may be exposed to vacuum at about 120° C. for about 12 to 24 hours.

The drying process results in a coating formed on the surface of the support 20. In an example, the thickness of the dried slurry (i.e., coating) ranges from about 5 μm to about 500 μm. In another example, the thickness of the dried slurry (i.e., coating) ranges from about 10 μm to about 100 μm.

The dried dispersion (i.e., coating) on the support 20 is then exposed to a heat treatment to initiate, complete, and/or improve the degree of imidization of the polyimide pre-polymer and to form the negative electrode 11. As such, during the heat treatment, multiple reactions take place. First, the pre-polymer is polymerized to form polyimide (i.e., the polyimide binder 16). Second, at least some of the polyimide may physically bond to the active material particles 12 or the carbon coating 14 through, for example, Van der Waals forces. In the examples disclosed herein, an additional binding enhancing agent (e.g., polyvalent carboxylic acid or its derivatives or polyvalent amine) is not added to the negative electrode 10.

The heat treatment of the deposited and dried dispersion (i.e., coating) may be performed at a temperature of at least 200° C. The temperature for heat treating may depend upon the chemistry of the polyimide pre-polymer, and in general ranges from about 250° C. to about 450° C. For example, when the polyimide pre-polymer includes no ether group and one carbonyl group ($C=O$), the temperature may range from about 300° C. to about 450° C., and when the polyimide pre-polymer includes no ether group and no carbonyl group, the temperature may range from about 250° C. to about 400° C. For comparison, when the polyimide pre-polymer includes one ether group and/or more than one carbonyl group, the heat treatment temperature may be up to about 450° C. For these particular polyimide pre-polymers, even with the increased heat treatment temperature, an electrode with a suitable cycle performance may not be obtained.

In any of the examples disclosed herein, the heat treatment may be performed under the protection of vacuum or an inert gas (e.g., nitrogen, argon, etc.). As examples, the heat treatment may be performed in an oven, or using a microwave and thermal treatment. The time for heat treating may depend upon the chemistry of the polyimide pre-polymer, and in general ranges from about 1 hour to about 20 hours.

In an example, heat treating is performed at a constant temperature for some determined time period. For an example, heating treatment may be performed in an oven under nitrogen gas at about 250° C. for about 2 hours. For another example, a microwave and thermal treatment may be performed at about 250° C. for about 30 minutes.

In another example, heat treating is performed using a temperature ramp, where the temperature is increased over time at determined or preset intervals. As an example, the deposited and dried dispersion may be initially heated at 250° C. for about 2 hours, and then the temperature may be raised to about 300° C. The deposited and dried dispersion may be heated at the 300° C. temperature for about 2 hours, and then the temperature may be raised to about 350° C. The deposited and dried dispersion may be heated at the 350° C. temperature for about 2 hours, and then the temperature may be raised to about 400° C., at which temperature the deposited and dried dispersion may be heated for at least another 2 hours.

After the heat treatment, the resulting polyimide binder 16 will have a molecular weight ranging from at least 75,000 g/mole to about 750,000 g/mole and an imidization degree of at least 95%. The resulting polyimide binder also has no ether group and no more than one carbonyl group in each of its repeating units, depending upon which monomers were used to form the polyimide precursor.

Heat treating forms the negative electrode 11, which includes the conductive filler 18, the active materials 10 (i.e., particles 12 with or without the carbon coating 14), and the polyimide binder 16 (at least some of which is bound to at least some of the active materials 10).

During the formation of the negative electrode 11, the solvent(s) is/are removed, and thus the resulting electrode 11 includes from about 65 wt % to about 95 wt % (based on total wt % of the negative electrode 11) of the active material(s) 10, from about 3 wt % up to 20 wt % (based on total wt % of the negative electrode 11) of the conductive filler 18, and from about 1 wt % up to 20 wt % (based on total wt % of the negative electrode 11) of the polyimide binder 16. In some examples, graphite is also included as another active material in an amount up to 20 wt %.

It is to be understood that the amount of the active material 10 included may depend, in part upon the size of the active material. It is to be further understood that the total amount of conductive filler 18 (whether a single filler or a combination of fillers is used) is at most 20 wt %. Table 1 provides several examples of the negative electrode 11 formulations, including the type of material and a range for the amount that may be included.

TABLE 1

| Active material Type | Active material wt % | Graphite wt % | Polyimide Binder wt % | Conductive Filler | |
|---|---|---|---|---|---|
| | | | | Carbon Black wt % | Carbon Nanofibers wt % |
| Carbon coated silicon nanoparticles | 65-80 | 5-10 | 5-18 | 3-10 | 0-10 |
| Silicon nanoparticles | 60-80 | 0-20 | 5-20 | 5-20 | 0-20 |
| Mixture of carbon coated silicon nanoparticles and silicon microparticles | 65-95 | 0-15 | 3-20 | 5-20 | 0-20 |

In some examples, the negative electrode 11 may be paired with a lithium electrode. In an example, the negative electrode 11 including the active materials 10 may be paired with lithium metal to form a half-cell.

The active materials 10 of the negative electrode 11 can sufficiently undergo lithium insertion and deinsertion. As such, the negative electrode 11 formed on the support 20 (negative-side current collector) may be used in a lithium ion battery 30. Examples of the lithium ion battery 30, 30' are shown in FIGS. 3A and 3B.

Figure 3A:
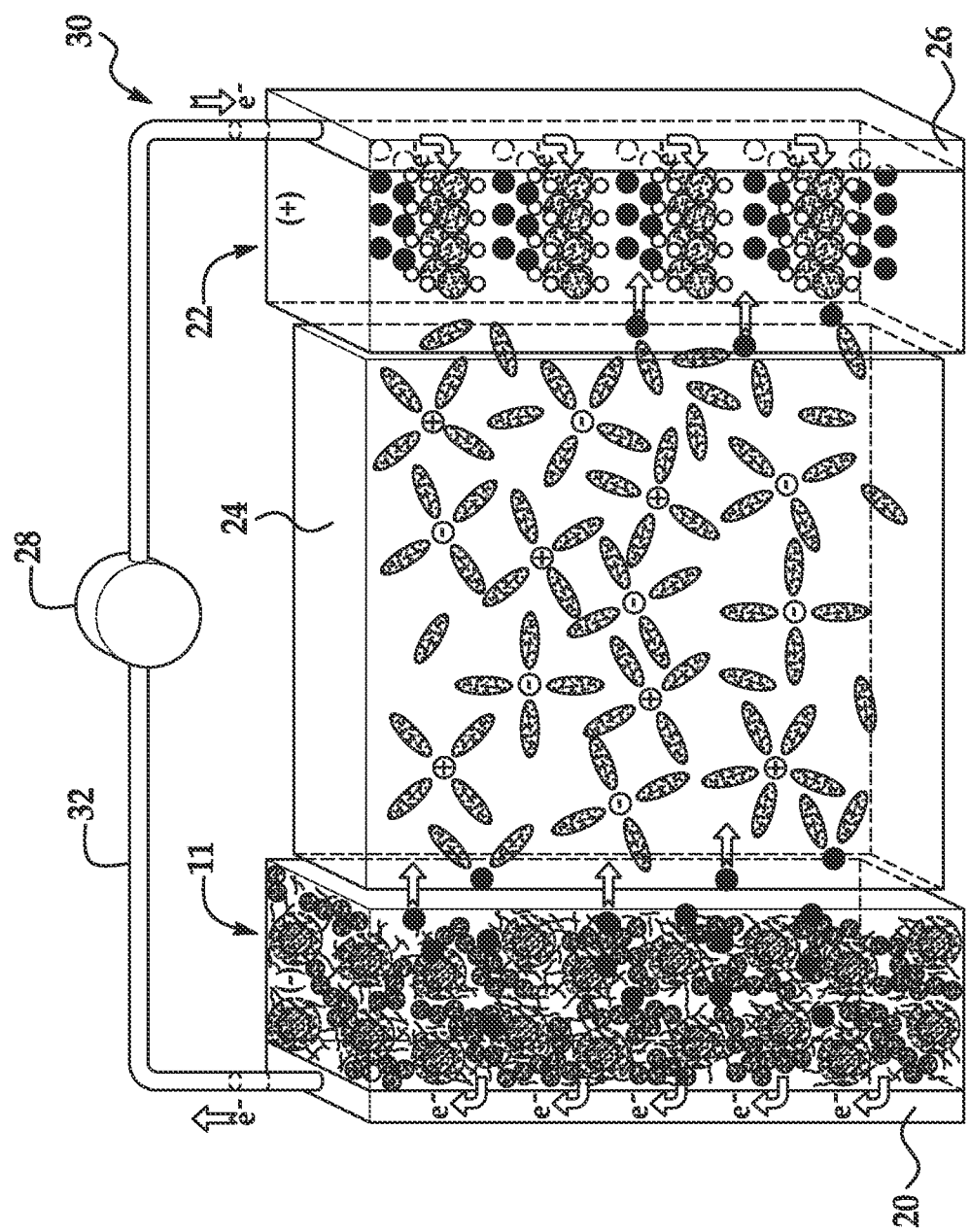
FIGS. 3A and 3B are perspective schematic view of examples of lithium ion batteries, including examples of the negative electrode disclosed herein.

In FIG. 3A, the negative electrode 11 contains active material particles 10 that are composed of silicon 12 or carbon coated silicon 12, 14. In FIG. 3B, the negative electrode 11 contains active material particles 10 that are composed of silicon 12 or carbon coated silicon 12, 14 and graphite (represented by the carbon atoms). In FIGS. 3A and 3B, the lithium ion battery 30, 30' includes the negative electrode 11, the negative side current collector 20, a positive electrode 22, a positive-side current collector 26, and a porous separator 24 positioned between the negative electrode 11 and the positive electrode 22.

Figure 3B:
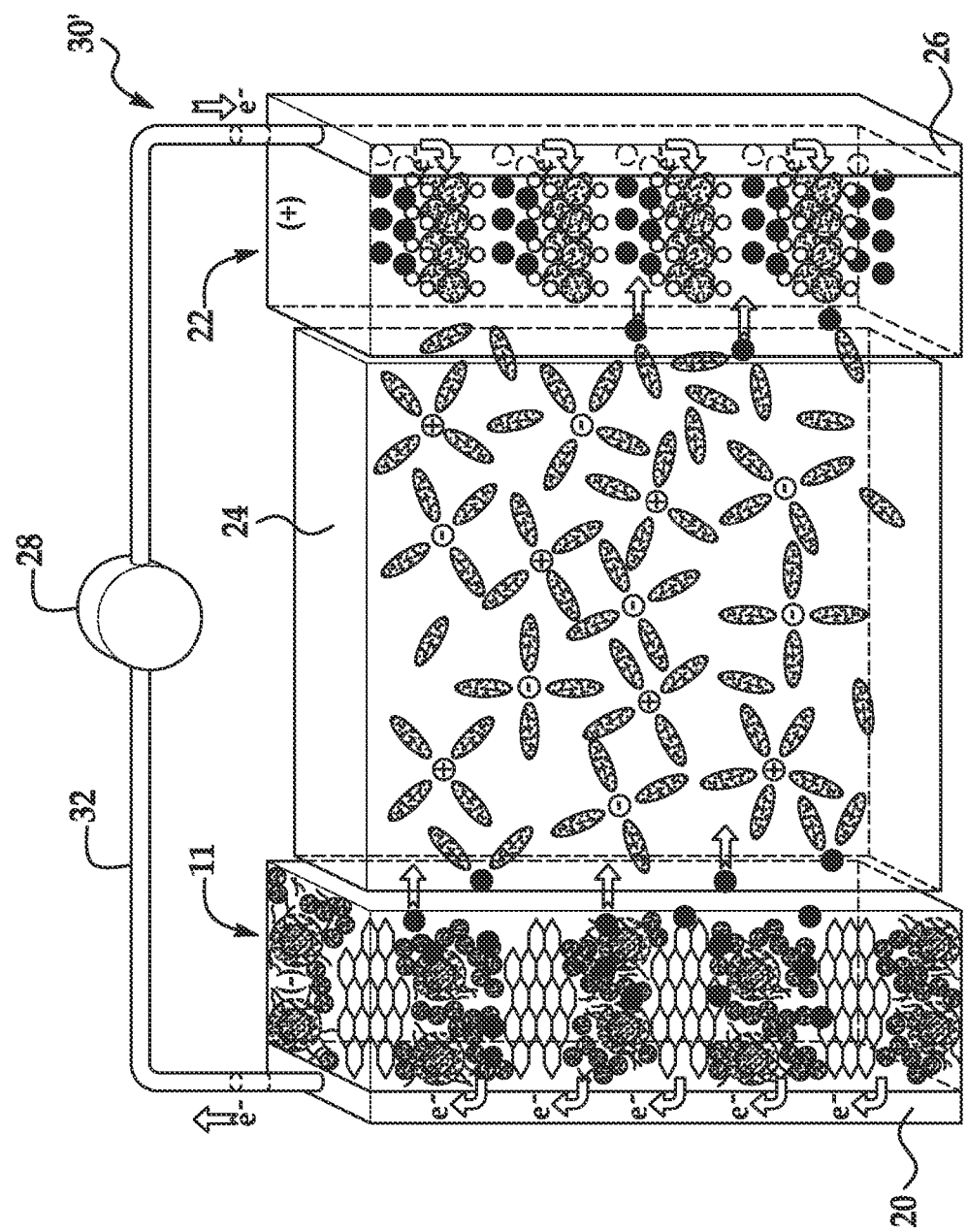

With respect to both FIGS. 3A and 3B, the positive electrode 22 may be formed from any lithium-based active material that can sufficiently undergo lithium insertion and deinsertion while functioning as the positive terminal of the lithium ion battery 30, 30'. One common class of known lithium-based active materials suitable for the positive electrode 22 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel [$Li(Ni_{0.5}Mn_{1.5})O_2$], a layered nickel-manganese-cobalt oxide [$Li(Ni_xMn_yCo_z)O_2$], or a lithium iron polyanion oxide, such as lithium iron phosphate ($LiFePO_4$) or lithium iron fluorophosphate ($Li_2FePO_4F$). Other lithium-based active materials may also be utilized, such as lithium nickel-cobalt oxide ($LiNi_xCo_{1-x}O_2$), aluminum stabilized lithium manganese oxide spinel ($Li_xMn_{2-x}Al_yO_4$), and lithium vanadium oxide ($LiV_2O_5$).

The lithium-based active material of the positive electrode 22 may be intermingled with a polymeric binder and a high surface area carbon. Suitable binders include polyvinylidene fluoride (PVdF), an ethylene propylene diene monomer (EPDM) rubber, and/or carboxymethyl cellulose (CMC)). The polymeric binder structurally holds the lithium-based active materials and the high surface area carbon together. An example of the high surface area carbon is acetylene black. The high surface area carbon ensures electron conduction between the positive-side current collector 26 and the active material particles of the positive electrode 22.

The positive-side current collector 26 may be formed from aluminum or any other appropriate electrically conductive material known to skilled artisans.

Still referring to both FIGS. 3A and 3B, the porous separator 24, which operates as both an electrical insulator and a mechanical support, is sandwiched between the negative electrode 11 and the positive electrode 22 to prevent physical contact between the two electrodes 11, 22 and the occurrence of a short circuit. In addition to providing a physical barrier between the two electrodes 11, 22, the porous separator 24 ensures passage of lithium ions (identified by the black dots and by the open circles having a (+) charge in FIGS. 3A and 3B) and related anions (identified by the open circles having a (−) charge in FIGS. 3A and 3B) through an electrolyte solution filling its pores. This helps ensure that the lithium ion battery 30, 30' functions properly.

The porous separator 24 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator 24 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator 24 may be chosen from a combination of the polyolefin (such as PE and/or PP) and one or more of the polymers listed above.

The porous separator 24 may contain a single layer or a multi-layer laminate fabricated from either a dry or wet process. For example, a single layer of the polyolefin and/or other listed polymer may constitute the entirety of the porous separator 24. As another example, however, multiple discrete layers of similar or dissimilar polyolefins and/or polymers may be assembled into the porous separator 24. In one example, a discrete layer of one or more of the polymers may be coated on a discrete layer of the polyolefin to form the porous separator 24. Further, the polyolefin (and/or other polymer) layer, and any other optional polymer layers, may further be included in the porous separator 24 as a fibrous layer to help provide the porous separator 24 with appropriate structural and porosity characteristics. Still other suitable porous separators 24 include those that have a ceramic layer attached thereto, and those that have ceramic filler in the polymer matrix (i.e., an organic-inorganic composite matrix).

Any appropriate electrolyte solution that can conduct lithium ions between the negative electrode 11 and the positive electrode 22 may be used in the lithium ion battery 30, 30'. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 30, 30' as well as how to manufacture or commercially acquire them. Examples of lithium salts that may be dissolved in an organic solvent to form the non-aqueous liquid electrolyte solution include $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(FSO_2)_2$, $LiN(CF_3SO_2)_2$, $LiAsF_6$, $LiPF_6$, and mixtures thereof. These and other similar lithium salts may be dissolved in a variety of organic solvents, such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

As shown in FIGS. 3A and 3B, the lithium ion battery 30, 30' also includes an interruptible external circuit 32 that connects the negative electrode 11 and the positive electrode 22. The lithium ion battery 30 may also support a load device 28 that can be operatively connected to the external circuit 32. The load device 28 receives a feed of electrical energy from the electric current passing through the external circuit 32 when the lithium ion battery 30, 30' is discharging. While the load device 28 may be any number of known electrically-powered devices, a few specific examples of a power-consuming load device 28 include an electric motor for a hybrid vehicle or an all-electrical vehicle, a laptop computer, a cellular phone, and a cordless power tool. The load device 28 may also, however, be an electrical power-generating apparatus that charges the lithium ion battery 30, 30' for purposes of storing energy. For instance, the tendency of windmills and solar panels to variably and/or intermittently generate electricity often results in a need to store surplus energy for later use.

The lithium ion battery 30, 30' may also include a wide range of other components that, while not depicted here, are nonetheless known to skilled artisans. For instance, the lithium ion battery 30, 30' may include a casing, gaskets, terminals, tabs, and any other desirable components or materials that may be situated between or around the negative electrode 11 and the positive electrode 22 for performance-related or other practical purposes. Moreover, the size and shape of the lithium ion battery 30, 30', as well as the design and chemical make-up of its main components, may vary depending on the particular application for which it is designed. Battery-powered automobiles and hand-held consumer electronic devices, for example, are two instances where the lithium ion battery 30, 30' would most likely be designed to different size, capacity, and power-output specifications. The lithium ion battery 30, 30' may also be connected in series and/or in parallel with other similar lithium ion batteries to produce a greater voltage output and current (if arranged in parallel) or voltage (if arranged in series) if the load device 28 so requires.

The lithium ion battery 30, 30' generally operates by reversibly passing lithium ions between the negative electrode 11 and the positive electrode 22. In the fully charged state, the voltage of the battery 30, 30' is at a maximum (typically in the range 2.0V to 5.0V); while in the fully discharged state, the voltage of the battery 30, 30' is at a minimum (typically in the range 0V to 2.0V). Essentially, the Fermi energy levels of the active materials in the positive and negative electrodes 22, 11 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 28 enables an electronic current flow in the external circuit 32 with a direction such that the difference between the Fermi levels (and, correspondingly, the cell voltage) decreases. The reverse happens during battery charging: the battery charger forces an electronic current flow in the external circuit 32 with a direction such that the difference between the Fermi levels (and, correspondingly, the cell voltage) increases.

At the beginning of a discharge, the negative electrode 11 of the lithium ion battery 30, 30' contains a high concentration of intercalated lithium while the positive electrode 22 is relatively depleted. When the negative electrode 11 contains a sufficiently higher relative quantity of intercalated lithium, the lithium ion battery 30, 30' can generate a beneficial electric current by way of reversible electrochemical reactions that occur when the external circuit 32 is closed to connect the negative electrode 11 and the positive electrode 22. The establishment of the closed external circuit under such circumstances causes the extraction of intercalated lithium from the negative electrode 11. The extracted lithium atoms are split into lithium ions (identified by the black dots and by the open circles having a (+) charge) and electrons (e⁻) as they leave an intercalation host at the negative electrode-electrolyte interface.

The chemical potential difference between the positive electrode 22 and the negative electrode 11 (ranging from about 2.0V to about 5.0V, depending on the exact chemical make-up of the electrodes 11, 22) drives the electrons (e⁻) produced by the oxidation of intercalated lithium at the negative electrode 11 through the external circuit 32 towards the positive electrode 22. The lithium ions are concurrently carried by the electrolyte solution through the porous separator 24 towards the positive electrode 22. The electrons (e⁻) flowing through the external circuit 32 and the lithium ions migrating across the porous separator 24 in the electrolyte solution eventually reconcile and form intercalated lithium at the positive electrode 22. The electric current passing through the external circuit 32 can be harnessed and directed through the load device 28 until the level of intercalated lithium in the negative electrode 10 falls below a workable level or the need for electrical energy ceases.

The lithium ion battery 30, 30' may be recharged after a partial or full discharge of its available capacity. To charge the lithium ion battery 30, 30', an external battery charger is connected to the positive and the negative electrodes 22, 11, to drive the reverse of battery discharge electrochemical reactions. During recharging, the electrons (e⁻) flow back towards the negative electrode 11 through the external circuit 32, and the lithium ions are carried by the electrolyte across the porous separator 24 back towards the negative electrode 11. The electrons (e⁻) and the lithium ions are reunited at the negative electrode 11, thus replenishing it with intercalated lithium for consumption during the next battery discharge cycle.

The external battery charger that may be used to charge the lithium ion battery 30, 30' may vary depending on the size, construction, and particular end-use of the lithium ion battery 30, 30'. Some suitable external battery chargers include a battery charger plugged into an AC wall outlet and a motor vehicle alternator.

Figure 4:
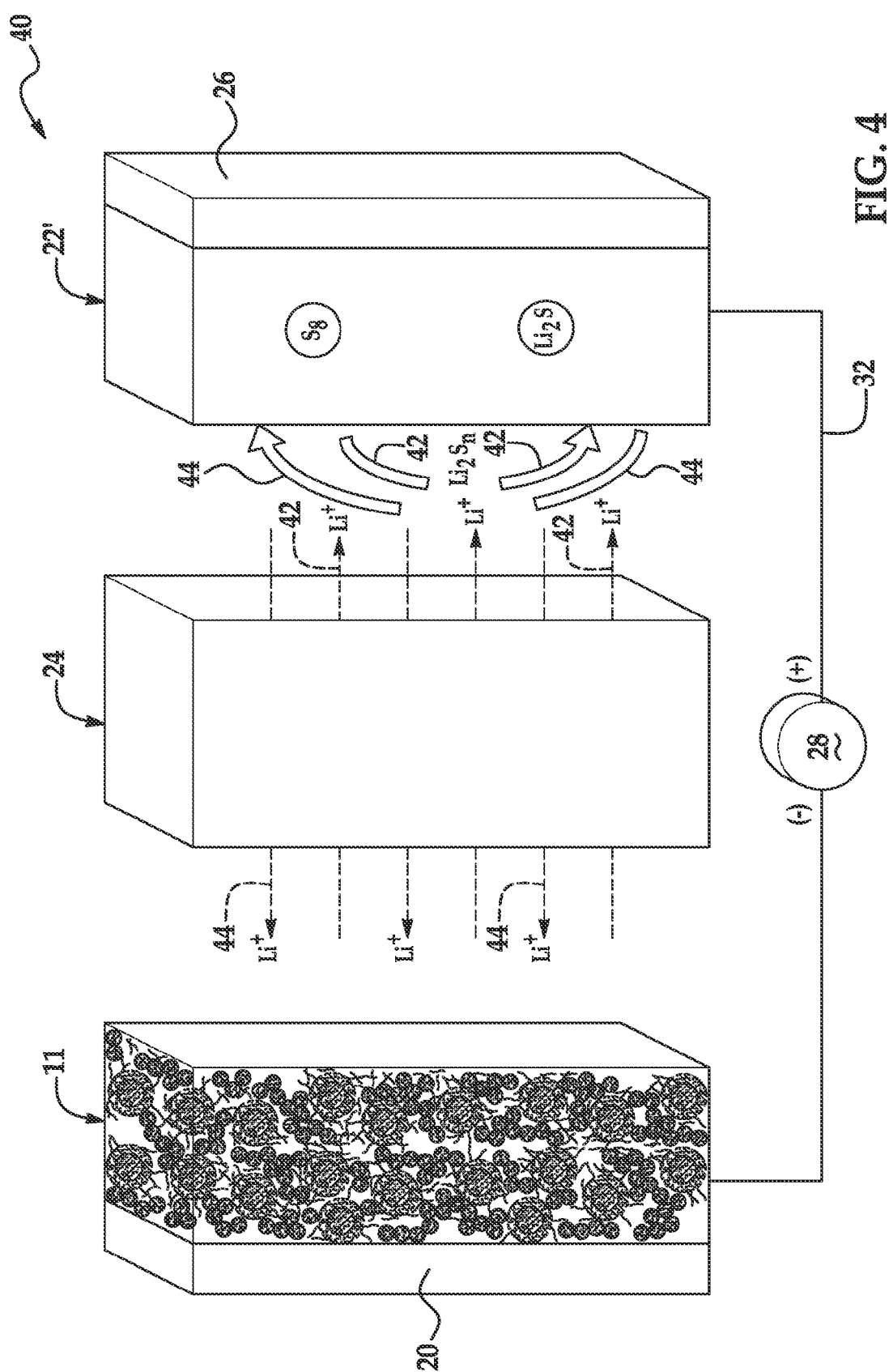
FIG. 4 is a perspective schematic view of an example of a lithium-sulfur battery, including an example of the negative electrode disclosed herein.

Referring now to FIG. 4, an example of a lithium-sulfur battery 40 with the negative electrode 11 described herein is shown. The lithium-sulfur battery 40 contains the negative electrode 11, the negative side current collector 20, a positive electrode 22', a positive-side current collector 26, and a porous separator 24 positioned between the negative electrode 11 and the positive electrode 22'. It is to be understood that the porous separator 24 may be the same type of porous separator 24 that is used in a lithium ion battery 30, 30' described herein. In addition, the negative current collector 20 and positive current collector 26 described herein for the lithium ion battery 30, 30' may also be used in the lithium-sulfur battery 40.

For the lithium-sulfur battery 40, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, LiSCN, $LiBF_4$, $LiB(C_6H_5)_4$ $LiAsF_6$, $LiCF_3SO_3$, $LiN(FSO_2)_2$, $LiN(CF_3SO_2)_2$, $LiAsF_6$, $LiPF_6$, LITFSI (Lithium Bis(Trifluoromethanesulfonyl)Imide), and mixtures thereof.

For the lithium-sulfur battery 40, the positive electrode 22' may include any sulfur-based active material that can sufficiently undergo lithium alloying and dealloying with aluminum or another suitable current collector functioning as the positive terminal of the lithium-sulfur battery 40. Examples of sulfur-based active materials include $S_8$, $Li_2S_8$, $Li_2S_6$, $Li_2S_4$, $Li_2S_2$, and $Li_2S$.

The sulfur-based active material of the positive electrode 22' may be intermingled with the polymer binder and the conductive filler. Suitable binders include polyvinylidene fluoride (PVdF), an ethylene propylene diene monomer (EPDM) rubber, carboxymethyl cellulose (CMC), styrene-butadiene rubber (SBR), polyacrylic acid (PAA), polyvinyl alcohol (PVA), sodium alginate, or other water-soluble binders. The polymer binder structurally holds the sulfur-based active material and the conductive filler together. An example of the conductive filler is a high surface area carbon, such as acetylene black or activated carbon. The conductive filler ensures electron conduction between the positive-side current collector 26 and the sulfur-based active material. In an example, the positive electrode active material and the polymer binder may be encapsulated with carbon.

The positive and negative electrodes 22', 11 are in contact, respectively, with current collectors 26, 20. The negative-side current collector 20 collects and moves free electrons to and from the external circuit 32. The positive-side current collector 26 collects and moves free electrons to and from the external circuit 32.

The lithium-sulfur battery 40 may support a load device 28 that can be operatively connected to the external circuit 32. The load device 28 receives a feed of electrical energy from the electric current passing through the external circuit 32 when the lithium-sulfur battery 40 is discharging. While the load device 28 may be any number of known electrically-powered devices, a few specific examples of a power-consuming load device include an electric motor for a hybrid vehicle or an all-electrical vehicle, a laptop computer, a cellular phone, and a cordless power tool. The load device 28 may also, however, be an electrical power-generating apparatus that charges the lithium-sulfur battery 40 for purposes of storing energy. For instance, the tendency of windmills and solar panels to variably and/or intermittently generate electricity often results in a need to store surplus energy for later use.

The lithium-sulfur battery 40 can include a wide range of other components that, while not depicted here, are nonetheless known to skilled artisans. For instance, the lithium-sulfur battery 40 may include a casing, gaskets, terminals, tabs, and any other desirable components or materials that may be situated between or around the negative electrode 11 and the positive electrode 22' for performance-related or other practical purposes. Moreover, the size and shape of the lithium-sulfur battery 40, as well as the design and chemical make-up of its main components, may vary depending on the particular application for which it is designed. Battery-powered automobiles and hand-held consumer electronic devices, for example, are two instances where the lithium-sulfur battery 40 would most likely be designed to different size, capacity, and power-output specifications. The lithium-sulfur battery 40 may also be connected in series and/or in parallel with other similar lithium-sulfur batteries 40 to produce a greater voltage output and current (if arranged in parallel) or voltage (if arranged in series) if the load device 28 so requires.

The lithium-sulfur battery 40 can generate a useful electric current during battery discharge (shown by reference numeral 42 in FIG. 4). During discharge, the chemical processes in the battery 40 include lithium ($Li^+$) dissolution from the surface of the negative electrode 11 and incorporation of the lithium cations into alkali metal polysulfide salts (i.e., $Li_2S$) in the positive electrode 22'. As such, polysulfides are formed (sulfur is reduced) on the surface of the positive electrode 22' in sequence while the battery 40 is discharging. The chemical potential difference between the positive electrode 22' and the negative electrode 11 (ranging from approximately 1.5 to 3.0 volts, depending on the exact chemical make-up of the electrodes 11, 22') drives electrons produced by the dissolution of lithium at the negative electrode 11 through the external circuit 32 towards the positive electrode 22'. The resulting electric current passing through the external circuit 32 can be harnessed and directed through the load device 28 until the lithium in the negative electrode 11 is depleted and the capacity of the lithium-sulfur battery 40 is diminished.

The lithium-sulfur battery 40 can be charged or re-powered at any time by applying an external power source to the lithium-sulfur battery 40 to reverse the electrochemical reactions that occur during battery discharge. During charging (shown at reference numeral 44 in FIG. 4), lithium plating to the negative electrode 11 takes place, and sulfur formation at the positive electrode 22' takes place. The connection of an external power source to the lithium-sulfur battery 40 compels the otherwise non-spontaneous oxidation of lithium at the positive electrode 22' to produce electrons and lithium ions. The electrons, which flow back towards the negative electrode 11 through the external circuit 32, and the lithium ions ($Li^+$), which are carried by the electrolyte across the porous membrane 24 back towards the negative electrode 11, reunite at the negative electrode 11 and replenish it with lithium for consumption during the next battery discharge cycle. The external power source that may be used to charge the lithium-sulfur battery 40 may vary depending on the size, construction, and particular end-use of the lithium-sulfur battery 40. Some suitable external power sources include a battery charger plugged into an AC wall outlet and a motor vehicle alternator.

To further illustrate the present disclosure, an example is given herein. It is to be understood that this example is provided for illustrative purposes and is not to be construed as limiting the scope of the disclosure.

EXAMPLES

Figure 5A:
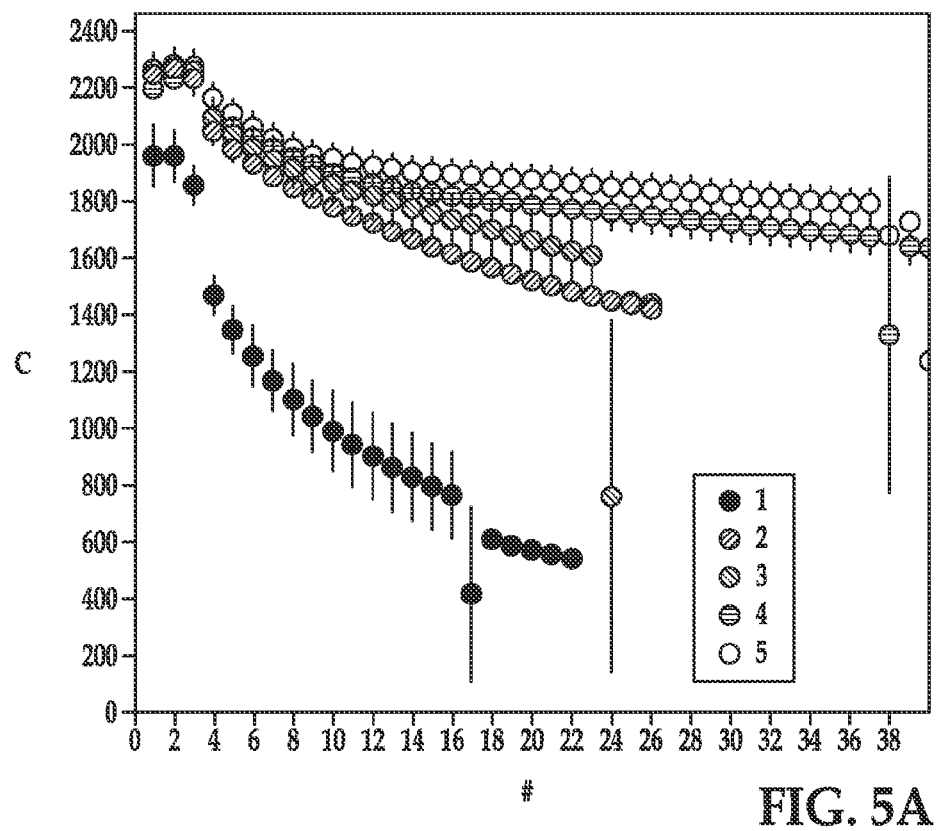
FIGS. 5A and 5B are graphs exhibiting the average specific capacity versus cycle number for examples of the negative electrode disclosed herein including different binders.
Figure 5B:
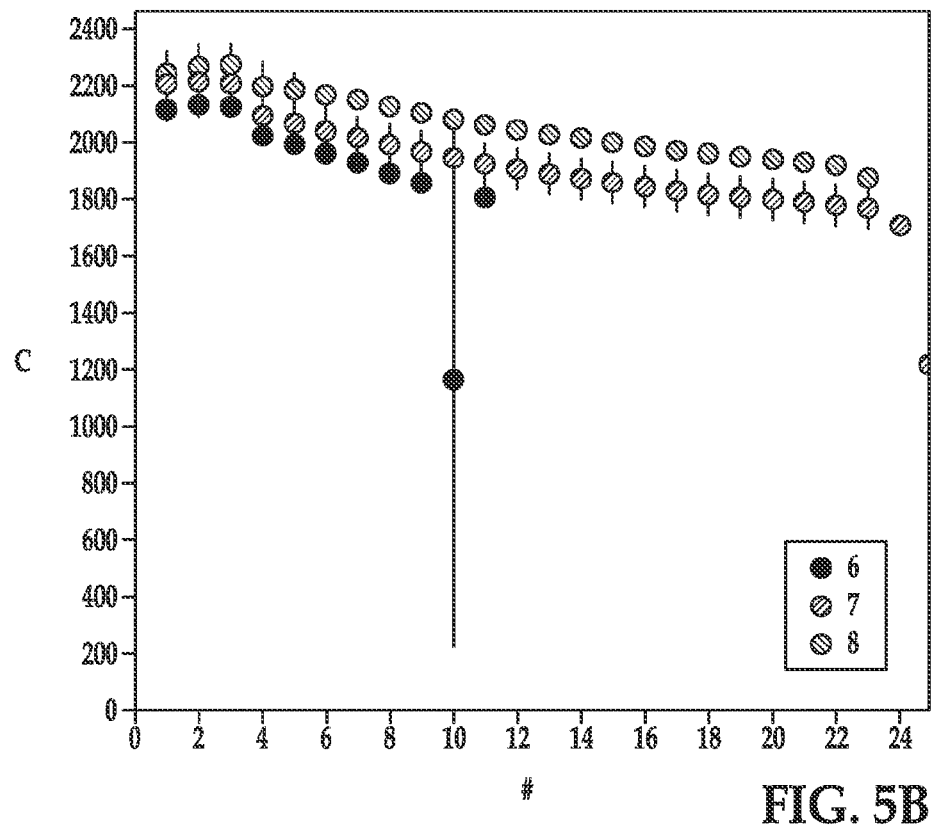
Figure 6:
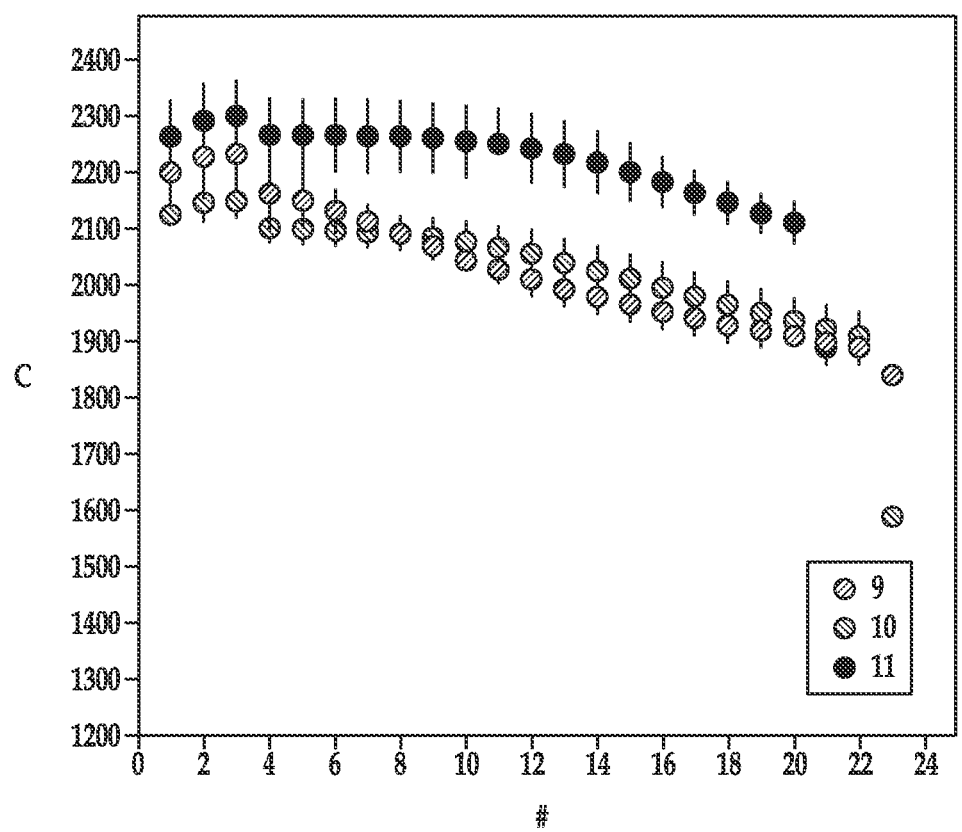
FIG. 6 is a graph exhibiting the average specific capacity versus cycle number for examples of the negative electrode disclosed herein including different conductive fillers.

Various examples of the negative electrode disclosed herein were prepared and tested for the average specific capacity. The results of the tested negative electrodes are shown in FIGS. 5A, 5B, and 6. In addition, the absorption of the electrolyte by various examples and comparative polyimide binders were tested. These results are shown in Table 2.

Example 1

FIGS. 5A and 5B

In this example, various examples of negative electrodes were made with different polyimide binders. In each example, silicon particles (particle size ~100 nm) were used as the active material, and the silicon loading was 0.6 mg/cm². Also in each example, the negative electrodes included 60 wt % of the silicon particles, 20 wt % of carbon black as the conductive filler, and 20 wt % of the respective polyimide binder. For the first set of negative electrodes (electrodes 1 through 5), the polyimide binder included no ether group and one carbonyl group in each of its repeating units' backbone. To form the polyimide binder for the first set of negative electrodes, benzophenonetetracarboxylic dianhydride was used as the dianhydride monomer, and phenylenediamine was used as the diamine monomer in a first polyimide pre-polymer solution. For the second set of negative electrodes (electrode 6 through 8), the polyimide binder included no ether group and no carbonyl group in each of its repeating units' backbone. For the second set of negative electrodes, a second polyimide pre-polymer solution was used, including 3,3',4,4'-biphenyltetracarboxylic dianhydride as the dianhydride monomer and P-phenylene-diamine as the diamine monomer.

To form the negative electrodes, the silicon particles, the respective polyimide pre-polymer solutions, and the carbon black were mixed in the solvent, N-Methyl-2-pyrrolidone (NMP), to form a dispersion. The dispersion was deposited on a copper current collector and dried. Example electrodes 1 through 5 were heat treated at 250° C., 300° C., 350° C., 400° C., and 450° C., respectively. Example electrodes 6 through 8 were heat treated at 250° C., 300° C., and 350° C., respectively.

Electrodes 1 through 8 were used, respectively, with a lithium metal positive electrode to construct half cells. Coin cells (2032 hardware) were assembled inside an Ar-filled glovebox. Microporous tri-layered polypropylene (PP) and polyethylene (PE) polymer membranes (Celgard 2032, available from Celgard) was used as the separator. The electrolyte consisted of 1 M $LiPF_6$ in a mixed solution of ethylene carbonate (EC), diethyl carbonate (DEC) (1:1 volume ratio), containing 10% fluoroethylene carbonate (FEC).

The coin cells were held at ambient temperature (from about 18° C. to about 22° C.) to perform electrochemical cycling tests. The cycling tests were carried out at a rate of C/10 and were cycled within the voltage window of 0.1V to 1V for at least 25 cycles. In addition, no press was used to calender the negative electrodes to reduce the electrode porosity before putting each electrode into the half-cell.

FIG. 5A depicts the average specific capacity (mAh/g) (Y axis labeled "C") versus the cycle number (X axis labeled "#") for the coin cells including electrodes 1 through 5 (formed with the polyimide with no ether group and one carbonyl group in the backbone structure of the repeating unit). FIG. 5B depicts the average specific capacity (mAh/g) (Y axis labeled "C") versus the cycle number (X axis labeled "#") for the coin cells including electrodes 6 through 8 (formed with the polyimide with no ether group and no carbonyl group in the backbone structure of the repeating unit).

As illustrated in FIG. 5A, the average capacity for the electrodes 1 through 5 (including the polyimide with no ether group and one carbonyl group present in the backbone structure of the repeating unit) was significantly affected depending upon the heating temperature that was used. In general, the average capacity increased as the heating temperature increased. Furthermore, electrodes 4 and 5, which were heated at the highest temperatures, exhibited the highest average capacity over a longer number of cycles. For this type of polyimide binder, the heating temperature used may be 300° C. or more in order to obtain a better performing negative electrode.

As illustrated in FIG. 5B, the average capacity for electrodes 6 through 8 (including the polyimide with no ether group and no carbonyl group present in the backbone structure of the repeating unit) remained relatively stable over at least 10 cycles, even when the lower heating temperature of 250° C. was used.

Comparing FIGS. 5A and 5B, example 6 generally had a higher capacity than example 1 over 12 cycles (both heated at 250° C.), example 7 generally had a higher capacity than example 2 after about 10 cycles (both heated at 300° C.), and example 8 generally had a higher capacity than example 3 after about 6 cycles (both heated at 350° C.).

It is believed that the negative electrodes (6-8) with no ether group and no carbonyl group present in the backbone structure of the repeating unit of the polyimide binder exhibit better average capacity performance because the polyimide binder absorbs less of the electrolyte, and thus does not swell. As such, the lack of ether group and carbonyl group in the backbone structure of the polyimide allows the negative electrode to undergo a much lower heat treatment temperature during preparation and still maintain its discharge capacity.

Example 2

FIG. 6

In this example, three examples of negative electrodes were made with different conductive fillers. In each example, silicon particles (particle size ~100 nm) were used as the active material, and the silicon loading was 0.6 mg/cm². Also in each example, the negative electrodes included 60 wt % of the silicon particles, 20 wt % of the respective conductive filler, and 20 wt % of a polyimide binder (the polyimide binder from Example 1 with no ether group and no carbonyl group present in the backbone structure of the repeating units). For electrode 9, the conductive filler was carbon black; for electrode 10, the conductive filler was a combination of carbon black and carbon nanofibers (weight ratio of 1:3); and for electrode 11, the conductive filler was a combination of carbon black and carbon nanofibers (weight ratio of 1:1).

Electrodes 9 through 11 were incorporated into the same type of half cell described above in reference to FIGS. 5A and 5B. The same tests and test conditions were used to test these half cells. FIG. 6 illustrates the results.

As illustrated in FIG. 6, each of the electrodes exhibited relatively good performance. However, the negative electrodes with carbon black and carbon nanofibers (electrodes 10 and 11) had an increased average capacity over the cycles compared to the negative electrode with only carbon black (electrode 9). Electrode 11, including the 1:1 carbon black: carbon nanofiber exhibited better performance over 20 cycles. It is believed that the mixture of carbon black and carbon nanofibers in the conductive filler improves the electrode stability, which results in an increased capacity.

Example 3

Several example and comparative example polyimide binders were prepared by exposing respective pre-polymer solutions to heat in order to initiate polymerization and imidization. The chemical structures of the repeating unit of the polyimide binders are shown in Table 2. The polyimide binders were then immersed in an electrolyte solution. The electrolyte solution consisted of 1M $LiPF_6$ in a mixed solution of ethylene carbonate (EC), diethyl carbonate (DEC) (1:1 volume ratio), containing 10% fluoroethylene carbonate (FEC).

The percentage of electrolyte solution absorbed by the respective polyimide binders was determined by first weighing a dry film of each of the polyimide binders in Table 2 before adding the electrolyte. After adding the electrolyte to each polyimide binder and allowing the polyimide binder to soak, a wet film of each polyimide binder was formed. The wet film was weighed. The percentage of electrolyte absorption by each polyimide binder was calculated by dividing the weight of the film saturated with the electrolyte (i.e., the wet film) by the weight of the dry film. The results are shown below in Table 2.

TABLE 2

| Polyimide | Number of Ether and Carbonyl Groups present in backbone | Chemical Structure of Repeating Unit | Percent Absorption |
|---|---|---|---|
| Comparative Example A | 2 ether groups and no carbonyl group | [structure] | 39% |
| Comparative Example B | 1 ether group and no carbonyl group | [structure] | 31% |

TABLE 2-continued

| Polyimide | Number of Ether and Carbonyl Groups present in backbone | Chemical Structure of Repeating Unit | Percent Absorption |
|---|---|---|---|
| Example C | No ether group and one carbonyl group | [structure] | 12% |
| Example D | No ether group and no carbonyl group | [structure] | 5% |

The results shown in Table 2 confirm the present inventors' belief that no ether groups and no more than one carbonyl group present in the backbone of the polyimide repeating unit advantageously reduces its absorption of the electrolyte solution, and (as shown in FIGS. 5A through 6) also enhances battery performance.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 30 nm to about 5 µm should be interpreted to include not only the explicitly recited limits of from about 30 nm to about 5 µm, but also to include individual values, such as 55 nm, 1.5 µm, 7 µm, etc., and sub-ranges, such as from about 100 nm to about 3 µm; from about 75 nm to about 6.8 µm, etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

What is claimed is:

1. A negative electrode material, comprising:
   an active material present in an amount ranging from about 60 wt % to about 95 wt % of a total wt % of the negative electrode material, wherein the active material includes carbon coated silicon, carbon coated silicon alloy, or a combination thereof, and wherein the active material has a diameter ranging from about 30 nm to less than 1000 nm;
   a polyimide binder present in an amount ranging from about 1 wt % to about 20 wt % of the total wt % of the negative electrode material, wherein a backbone structure of each repeating unit of the polyimide binder has no ether group present and no more than one carbonyl group present; and
   a conductive filler present in an amount ranging from about 3 wt % to about 20 wt % of the total wt % of the negative electrode material.

2. The negative electrode material as defined in claim 1 wherein the active material further includes silicon.

3. The negative electrode material as defined in claim 1, further comprising an other active material present in an amount ranging from about 1 wt % to about 20 wt % of the total wt % of the negative electrode material, wherein the other active material is graphite.

4. The negative electrode material as defined in claim 1 wherein:
   the polyimide binder is formed from a diamide monomer and a dianhydride monomer;
   the diamide monomer is selected from the group consisting of p-phenylenediamine, toluene diamine, and diaminodiphenylmethane; and
   the dianhydride is selected from the group consisting of 3,3',4,4'-biphenyltetracarboxylic dianhydride, 4,4',5,5'-sulfonyldiphthalic anhydride, 3,3',4,4'-benzophenonetetracarboxylic dianyhdride, and pyromellitic dianhydride.

5. The negative electrode material as defined in claim 1 wherein the conductive filler is selected from the group consisting of carbon black, carbon nanofibers, or a combination thereof.

6. The negative electrode material as defined in claim 5 wherein:
   the conductive filler consists of a combination of the carbon black and the carbon nanofibers; and
   the carbon black and the carbon nanofibers are present in a ratio ranging from about 1:1 to about 1:3.

7. The negative electrode material as defined in claim 1 wherein the backbone structure of each repeating unit of the polyimide binder has no ether group and no carbonyl group present.

8. The negative electrode material as defined in claim 1 wherein the polyimide binder has a molecular weight ranging from about 75,000 grams/mole to about 750,000 grams/mole.

9. The negative electrode material as defined in claim 1 wherein the active material consists of carbon coated silicon.

10. A negative electrode material, consisting of:
an active material present in an amount ranging from about 60 wt % to about 95 wt % of a total wt % of the negative electrode material, wherein the active material is selected from the group consisting of carbon coated silicon, carbon coated silicon alloy, and combinations thereof, and wherein the active material has a diameter ranging from about 30 nm to less than 1000 nm;
a polyimide binder present in an amount ranging from about 1 wt % to about 20 wt % of the total wt % of the negative electrode material, wherein a backbone structure of each repeating unit of the polyimide binder has no ether group present and no more than one carbonyl group present; and
a conductive filler present in an amount ranging from about 1 wt % to about 20 wt % of the total wt % of the negative electrode material.

11. A lithium-based battery, comprising:
a positive electrode;
a negative electrode including:
an active material present in an amount ranging from about 60 wt % to about 95 wt % of the total wt % of the negative electrode material, wherein the active material includes carbon coated silicon, carbon coated silicon alloy, or a combination thereof, and wherein the active material has a diameter ranging from about 30 nm to less than 1000 nm;
a polyimide binder present in an amount ranging from about 1 wt % to about 20 wt % of the total wt % of the negative electrode material, wherein a backbone structure of each repeating unit of the polyimide binder has no ether group present and no more than one carbonyl group present;
a conductive filler present in an amount ranging from about 1 wt % to about 20 wt % of the total wt % of the negative electrode material; and
a microporous polymer separator soaked in an electrolyte solution, the microporous polymer separator being disposed between the positive electrode and the negative electrode.

12. The lithium-based battery as defined in claim 11 wherein:
the lithium-based battery is a lithium ion battery:
the positive electrode includes a lithium transition metal oxide based active material selected from the group consisting of $LiMn_2O_4$, $Li(Ni_{0.5}Mn_{1.5})O_2$, $Li(Ni_xMn_y\text{-}Co_z)O_4$, $LiCoO_2$, $LiNiO_2$, $LiFePO_4$, $Li_2MSiO_4$(M =Co, Fe, Mn), $xLi_2MnO_3\text{-}(1-x)LiMO_2$(M is composed of any ratio of Ni, Mn and Co), and a high efficiency nickel-manganese-cobalt material; and
the electrolyte solution includes an organic solvent and a lithium salt dissolved in the organic solvent, the organic solvent being selected from the group consisting of cyclic carbonates, linear carbonates, aliphatic carboxylic esters, γ-lactones, chain structure ethers, cyclic ethers, and mixtures thereof, and the lithium salt being selected from the group consisting of $LiClO_4$, $LiAlCl_4$, LiI, LiBr, LiSCN, $LiBF_4$, $LiB(C_6H_5)_4$ $LiAsF_6$, $LiCF_3SO_3$, $LiN(FSO_2)_2$, $LiN(CF_3SO_2)_2$, $LiAsF_6$, $LiPF_6$, LITFSI, and mixtures thereof.

13. The lithium-based battery as defined in claim 11 wherein:
the lithium-based battery is a lithium-sulfur battery:
the positive electrode includes a sulfur based active material selected from the group consisting of $S_8$, $Li_2S_8$, $Li_2S_6$, $Li_2S_4$, $Li_2S_2$, and $Li_2S$; and
the electrolyte solution includes an ether based solvent and a lithium salt dissolved in the ether based solvent, the ether based solvent being selected from the group consisting of 1,3-dioxolane, tetrahydrofuran, 2-methyltetrahydrofuran, 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof, and the lithium salt being selected from the group consisting of $LiClO_4$, $LiAlCl_4$, LiI, LiBr, LiSCN, $LiBF_4$, $LiB(C_6H_5)_4$ $LiAsF_6$, $LiCF_3SO_3$, $LiN(FSO_2)_2$, $LiN(CF_3SO_2)_2$, $LiAsF_6$, $LiPF_6$, LITFSI, and mixtures thereof.

14. The lithium-based battery as defined in claim 11 wherein:
the active material further includes silicon; and
the negative electrode further includes an other active material present in an amount ranging from about 1 wt % to about 20 wt % of the total wt % of the negative electrode material, wherein the other active material is graphite.

15. The lithium-based battery as defined in claim 11 wherein:
the polyimide binder is formed from a diamide monomer and a dianhydride monomer;
the diamide monomer is selected from the group consisting of p-phenylenediamine, toluene diamine, and diaminodiphenylmethane; and
the dianhydride is selected from the group consisting of 3,3',4,4'-biphenyltetracarboxylic dianhydride, 4,4',5,5'-sulfonyldiphthalic anhydride, 3,3',4,4'-benzophenonetetracarboxylic dianyhdride, and pyromellitic dianhydride.

16. The lithium-based battery as defined in claim 11 wherein:
the conductive filler consists of a combination of carbon black and carbon nanofibers; and
the carbon black and the carbon nanofibers are present in a ratio ranging from about 1:1 to about 1:3.

17. A method for making a negative electrode, comprising:
mixing an active material, a polyimide pre-polymer, and a conductive filler to form a slurry, wherein the active material is selected from the group consisting of carbon coated silicon, carbon coated silicon alloy, and combinations thereof, and wherein the active material has a diameter ranging from about 30 nm to less than 1000 nm;
depositing the slurry on a support; and
heat treating the deposited slurry at a temperature of at least 250° C., thereby forming a polyimide binder having an imidization degree above 95% and forming the negative electrode.

18. The method as defined in claim 17 wherein:
the active material is present in an amount ranging from about 60 wt % to about 95 wt % of a total solid wt % of the slurry;

the polyimide pre-polymer is present in an amount ranging from about 5 wt% to about 20 wt % of the total solid wt % of the slurry; and the conductive filler is present in an amount ranging from about 3 wt % to about 20 wt % of the total solid wt % of the slurry.

19. The method as defined in claim 18, further comprising adding an other active material to the slurry in an amount ranging from about 5 wt % to about 10 wt % of the total solid wt % of the slurry, the other active material being graphite.

* * * * *